(12) United States Patent
Flanagan et al.

(10) Patent No.: US 6,710,212 B2
(45) Date of Patent: Mar. 23, 2004

(54) INCREMENTAL FLOW REACTOR AND METHOD FOR PARALLEL SCREENING

(75) Inventors: William Patrick Flanagan, Rexford, NY (US); Cheryl Lynn Sabourin, Niskayuna, NY (US); James Lawrence Spivack, Cobleskill, NY (US)

(73) Assignee: General Electric Company, Niskayuna, NY (US)

( * ) Notice: Subject to any disclaimer, the term of this patent is extended or adjusted under 35 U.S.C. 154(b) by 84 days.

(21) Appl. No.: 10/180,870

(22) Filed: Jun. 26, 2002

(65) Prior Publication Data

US 2003/0045758 A1 Mar. 6, 2003

Related U.S. Application Data (63) Continuation-in-part of application No. 09/443,640, filed on Nov. 18, 1999, now abandoned.
(60) Provisional application No. 60/133,061, filed on May 7, 1999.

(51) Int. Cl.$^7$ ............................................... C07C 39/16
(52) U.S. Cl. ....................... 568/728; 568/727
(58) Field of Search ..................... 568/727, 728

(56) References Cited

U.S. PATENT DOCUMENTS 5,262,575 A * 11/1993 Dianis ........................ 570/235

FOREIGN PATENT DOCUMENTS

| EP | 0 199 499 | 10/1986 |
|---|---|---|
| EP | 0 770 590 | 5/1997 |

OTHER PUBLICATIONS

*Applied Microbiology and Biotechnology*, "Performance Assessment of Two Patent Strains of *Zymomonaz*mobilis in Batch and Continuous Fermentations", Niels Stevnsborg and Hugh G. Lawford, 25: 106–115, 1986.

*J. Am. Chem. Soc.*, "Robotic Orchestration of Organic Reactions: Yield Optimization Via An Automated System With Operator–Specified Reaction Sequences", AR Frisbee, MH Nantz, GW Kramer and PL Fuchs, 106, 71,43–7145, 1984.

*Biorganic&Medicinal Chemistry Letters*, Pergamon, "Rapid Optimization of An Ice Inhibitor Synthesis Using Multiple Reaction Conditions In a Parallel Array", Joseph S. Warmus, Todd R. Ryder, John C. Hodges, Robert M. Kennedy and Kenneth D. Brady, 8, 2309–2314, 1998.

*Tetrahedron Letters*, Pergamon "Ion–Exchange Resins for Solution Phase Parallel Synthesis of Chemical Libraries", Leah M. Gayo and Mark J. Suto, vol. 38, No. 4, 513–516, 1997.

*Tetrahedron Letters*, Pergamon "Solution–Phase Parallel Synthesis using Ion–Exchange Resins", Mark J. Suto, Leah M. Gayo–Fung, Moorthy SS Palanki and Robert Sullivan, vol. 54, 4141–4150, 1998.

\* cited by examiner

*Primary Examiner*—Michael L. Shippen
(74) *Attorney, Agent, or Firm*—Andrew J. Caruso; Patrick K. Patnode

(57) ABSTRACT

A method of producing a chemical reaction is provided. In the practice of one embodiment of the invention, the method includes the steps of providing a reaction vessel and reactants; placing at least one of the reactants in the reaction vessel; and allowing the reaction to proceed for a time interval. A volume increment of at least one of the reactants is withdrawn from the reaction vessel, and a volume increment of at least one of the reactants is added to the reaction vessel. The volume increment withdrawal/addition is repeated after successive time intervals until the reaction reaches a substantially steady state. In various alternative embodiments, the volume increment withdrawal can take place before, after, or contemporaneously with the volume increment addition.

36 Claims, 5 Drawing Sheets

FIG. 1A

Hypothetical "fast" reaction

FIG. 1B

Hypothetical "slow" reaction

INCREMENTAL FLOW REACTOR AND METHOD FOR PARALLEL SCREENING

CROSS REFERENCE TO RELATED APPLICATIONS

This application is a continuation-in-part of U.S. application Ser. No. 09/443,640, filed Nov. 18, 1999 now abandoned, which claims priority to and the benefit of the filing date of Provisional Application Serial No. 60/133,061, filed May 7, 1999, entitled "INCREMENTAL FLOW REACTOR AND METHOD FOR PARALLEL SCREENING", which applications are incorporated herein by reference.

BACKGROUND OF INVENTION

The present invention is directed to a method for rapid screening of reactants, catalysts, and associated process conditions and, more specifically, to a method of producing a chemical reaction that emulates those carried out in production-scale, continuous flow or continuous stirred tank reactors.

Since its introduction in 1970, combinatorial chemistry has become a popular research tool among scientists in many fields. High throughput and combinatorial screening for biological activity have been prevalent in the pharmaceutical industry for nearly twenty years, and more recently, high throughput and combinatorial screening for improved catalysts for the bulk chemical industries have enjoyed increasing popularity.

A substantial reason for the lag in the development of high throughput and combinatorial screening for production scale reactions is the difficulty in emulating the production-scale reactions at the micro-scale necessary for high throughput or combinatorial work. In particular, special problems can arise for reactions that are significantly dependent on flow rate or configuration.

Most combinatorial work to date has focused on "solid phase" reactions. It is known that a wide variety of organic reactions can be carried out on substrates immobilized on resins. However, a substantial number of production scale reactions are "liquid phase" or "mixed phase" and, as noted, are carried out in continuous flow reactor systems.

Early efforts in high throughput screening of solutions have focused on catalyst screening. Before the application of the high throughput and combinatorial approaches, catalyst testing was traditionally accomplished in bench scale or larger pilot plants in which the feed to a continuous flow reactor was contacted with a catalyst under near steady state reaction conditions. However, rapid and combinatorial screening of reactants, catalysts, and associated process conditions require that a large number of reactions or catalytic systems be tested simultaneously. In certain applications, screening-level data can be generated by using miniaturized batch reactors in conjunction with liquid-handling robots that aliquot the appropriate catalysts and reactants to each vial or reaction well. In other applications, however, batch reactions do not behave in the same fashion as continuous flow reactions and could provide misleading results if the goal of screening is to identify reactants or catalyst systems that will be implemented in production-scale continuous flow reactors.

As the demand for bulk chemicals has continued to grow, new and improved methods of producing more product with existing resources are needed to supply the market. Unfortunately, the identities of additional effective reactants and catalyst systems for these processes continue to elude the industry. What are needed are new and improved methods and devices for rapid screening of potential reactants, catalysts, and associated process conditions.

SUMMARY OF INVENTION

Accordingly, the present invention is directed to a method for producing a chemical reaction in a manner useful for rapid screening of reactants, catalysts, and associated process conditions.

In a particular embodiment, the present invention is directed to a method for producing a chemical reaction between a monohydroxyaromatic compound and an aldehyde or ketone to produce a bisphenol in a batch reactor emulating the conditions of a continuous flow reactor by incremental flow, the method comprising the steps of:

a) providing a reaction vessel and reactants;

b) placing reactants in the reaction vessel;

c) allowing the reaction to proceed for a time interval;

d) withdrawing a volume increment of the reaction mixture comprising at least one of the reactants from the reaction vessel;

e) adding a volume increment of at least one of the reactants to the reaction vessel; and f) repeating steps c), d), and e) until the reaction reaches a substantially steady state, as shown by analysis.

In alternative embodiments, the volume increment withdrawal can take place before, after, or contemporaneously with the volume increment addition.

BRIEF DESCRIPTION OF DRAWINGS

Various features, aspects, and advantages of the present invention will become more apparent with reference to the following description, claims, and appended drawings, wherein

DETAILED DESCRIPTION

The present invention is directed to a method for producing a chemical reaction. Generally, it is contemplated that the method can be useful for high throughput screening of reactants, catalysts, and associated reaction conditions. More specifically, it is contemplated that the present method can be useful for parallel high-throughput screening of chemical reactants, catalysts, and processes in which continuous flow of reactor influents and effluents is desired. The method allows researchers to mimic continuous flow in order to obtain useful information that may be dependent on flow rate or configuration (e.g., reaction yield; selectivity; and other reaction characteristics or process variables). It is believed that the method can be particularly useful for studying the formation of bisphenol A from phenol and acetone.

As noted, a significant number of production scale chemical processes cannot be accurately emulated in a batch reactor. The present method overcomes the limitations of traditional batch screening while advantageously allowing the use of convenient, miniaturized reactor vessels, such as vial arrays, multi-welled microtitre plates, and the like.

In the practice of one embodiment of the invention, the method includes the steps of providing a reaction vessel and reactants; placing at least one of the reactants in the reaction vessel; and allowing the reaction to proceed for a time interval. A volume increment of at least one of the reactants is added to the reaction vessel, and a volume increment of at least one of the reactants is withdrawn from the reaction vessel. The volume increment addition/withdrawal is repeated after successive time intervals until the reaction reaches a substantially steady state. As used herein, the term "substantially steady state" refers to a point where the reaction effectively emulates a reaction of interest, such as those carried out in production-scale, continuous flow or continuous stirred tank reactors. As noted, certain reaction data are dependent on flow rate, residence time, or similar parameters. Utilizing the present method, these parameters can be manipulated in order to obtain useful data at a micro scale.

In various alternative embodiments, the volume increment withdrawal can take place before, after, or contemporaneously with the volume increment addition. The preferred order will depend on the discrete circumstances of a given application. For example, when working with micro amounts, it may be preferable to add a volume increment before withdrawal in order to maintain favorable reaction conditions within the reaction vessel. In a preferred embodiment, the time increments are selected such that withdrawals are made before the reactants present in the reaction vessel have had a chance to completely react, thereby ensuring substantially continuous reactivity within the reaction vessel.

Each volume increment added contains at least one of the reactants. In the present context, the term "reactant" means any substance that affects the reaction in any capacity, including catalysts, promoters, and the like. The relative amounts of each reactant in the volume increments can be determined based on the differential depletion, exhaustion, or inactivation of each species during the course of the reaction. It is also contemplated that multiple additions of various reactants and reactant combinations can be made. In a preferred embodiment, the total volume of the multiple additions is equivalent to the volume increment withdrawn.

Withdrawn volume increments can be dealt with in a number of ways. For example, each volume increment withdrawn from the reaction vessel can be analyzed individually for properties of interest. Selected volume increments can be analyzed, while the non-analyzed volume increments are discarded. Alternatively, withdrawn volume increments can be pooled to provide cumulative data for the entire course of the reaction or for selected time periods of interest.

In further alternative embodiments, automated robotic equipment can be used to deliver and remove the volume increments. Desired space velocity and reactor residence times can be obtained by controlling the size of the volume increments withdrawn/added and the size of the time intervals between volume increment additions. Unless otherwise noted, time intervals denote the period of time between successive volume additions.

The effective liquid residence time in the reactor can be defined by the following relationship:

$$RT = \frac{V_{tot} \cdot \Delta t}{\Delta V}$$

Likewise, the effective liquid flow rate (Q) can be defined by the following relationship:

$$Q = \frac{\Delta V}{\Delta t}$$

It is evident that the behavior of the present incremental flow method approaches that of a continuous stirred tank reactor as the time interval and volume increments approach zero:

$$\lim_{\Delta t, \Delta V \to 0} (IFR) = \text{continuous stirred tank reactor } (CSTR)$$

Conversely, as the volume increment approaches the total liquid volume in the reaction vessel, the behavior of the incremental flow method approaches that of a sequential series of batch reactions:

$$\lim_{\Delta V \to V} (IFR) = \text{sequential series of batch reactions}$$

Figure 1A:
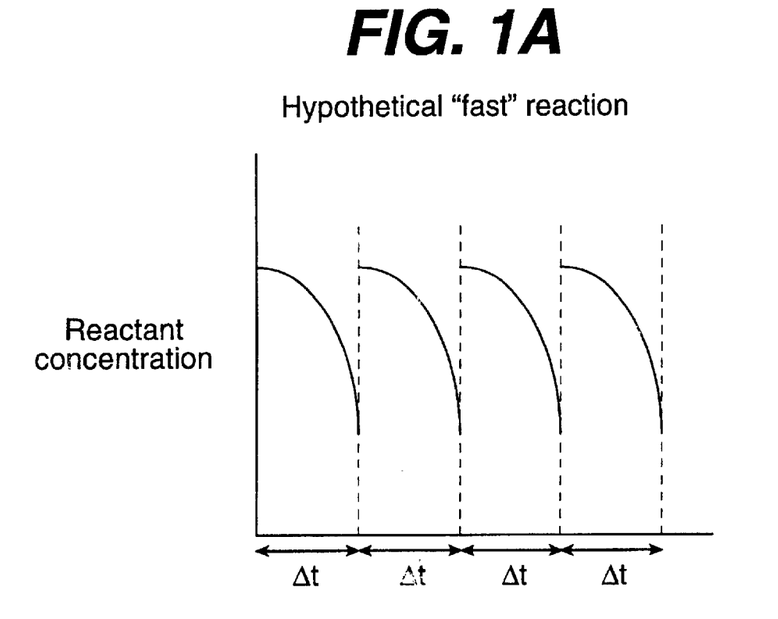
FIG. 1 is a graphical representation of concentration gradients of various reactions.
Figure 1B:
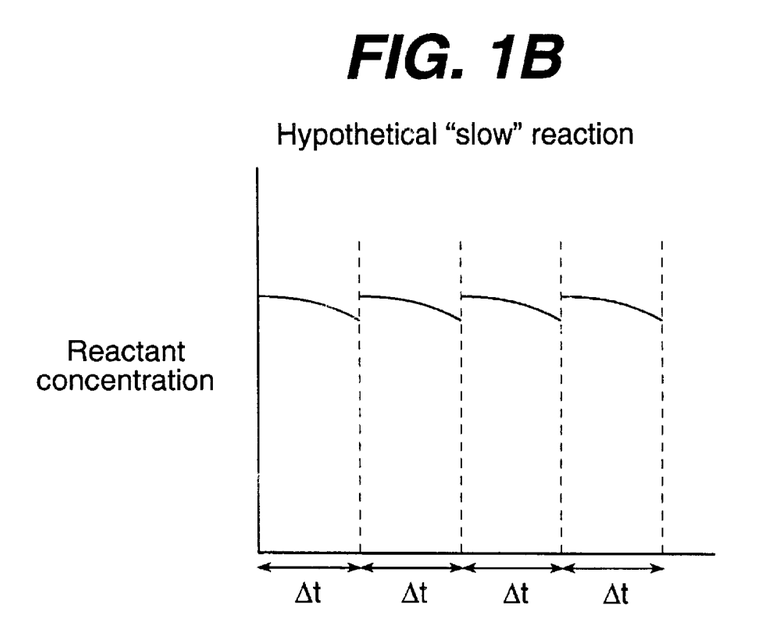

The selection of optimal $\Delta t$ and $\Delta V$ values will depend on several factors, including reaction kinetics and the capabilities of the liquid-handling equipment. As shown in FIG. 1, a faster reaction will generally exhibit larger concentration gradients within a given time interval than a slower reaction. Preferably, for a given reaction system, the $\Delta t$ and $\Delta V$ values should be chosen to minimize the within-increment concentration gradients without placing excessive demands on liquid handling equipment.

Accordingly, it may be useful to determine the sub-interval concentration gradients at various points throughout the course of the reaction. Not only can this information be useful in verifying that appropriate $\Delta t$ and $\Delta V$ values have been chosen, it could also provide valuable insight regarding reaction kinetics. Such information can be obtained by establishing a reaction as described above. That is, allowing the reaction to proceed for a time interval, followed by controlled addition and withdrawal of nominal volume increments until the reaction reaches a point of interest. When concentration gradient information is desired, a sample volume increment is added that is larger (e.g., two to three times larger) than the nominal $\Delta V$. Volume sub-increments are then withdrawn at appropriate subintervals within the time interval, such that the sum of the volume sub-increments is equivalent to the sample volume increment. Analysis of the withdrawn sub-increments provides desired concentration gradient data. The reaction is allowed to continue until sub-interval concentration gradient information is again desired, at which point the steps for obtaining such information can be repeated.

In a further alternative embodiment, volume increment withdrawals are effected by inserting a probe to a predetermined level in the reaction vessel and withdrawing reactor fluid until no further fluid can be withdrawn by the probe at that predetermined level. In this manner the probe acts as a liquid level controller, thereby ensuring that the liquid level in the reaction vessel will be the same at the end of each time interval. When using a robotic probe, the efficacy of this approach depends, inter alia, on how accurately and reproducibly the probe can be positioned at the desired liquid level.

This embodiment reduces or eliminates the possibility of cumulative volume error related to the accuracy of incremental volume withdrawals and also compensates for error related to the accuracy of incremental volume additions. For example, if a slightly larger than desired volume increment is added at the beginning of a time interval, a similarly larger volume increment will be withdrawn at the end of that time interval since the volume increment removal is based on a liquid level control mechanism. Conversely, a smaller than desired volume increment addition would be compensated for by a smaller volume increment removal.

In various embodiments the present invention may be employed in producing any chemical reaction run in a batch or flow through reactor under kinetic control because the product forms and is removed before it can reach thermodynamic equilibrium. Some particular examples of suitable reactions under kinetic control include, but are not limited to, enolate formation in enolizable compounds and ortho-directed lithiations in substituted aromatic compounds using hindered bases such as lithium diethylamide, lithium diisopropylamide, lithium bis(trimethylsilyl)amide, lithium tetramethylpiperidide, and the like; metal-halogen exchange; kinetically controlled rearrangements such as Ireland-Claisen rearrangements; de-symmetrizations and kinetic resolutions, where a chiral catalyst is used with a racemic or enantiotopic substrate wherein one enantiomer (or enantiotopic site, respectively) reacts faster than the other, and wherein it is desired to obtain either the product or the unreacted enantiomer of the staring material; selective oxidations, for example of cyclic hydrocarbons, aromatic compounds, alkylated aromatic compounds, or alcohols, for example using selenium dioxide or hydrogen peroxide in the presence of homogeneous catalysts, for example comprising cobalt or copper, or heterogeneous catalysts, for example comprising a zeolite or supported catalyst; selective epoxidation; Sharpless epoxidation; Pd catalyzed reactions; Heck reactions; selective reductions; reductive aminations, for example wherein an iminium ion is reduced faster than a carbonyl substrate; enantioselective protonations; ring-opening polymerization of trifluoropropyl methyl cyclotrisiloxane with a base to make a fluorosilicone; dehydrohalogenations of compounds bearing more than one halogen; transesterification reactions; ether exchange reactions; redistributions in cyclic and/or linear siloxanes; nitrations; chlorinations; brominations; iodinations; and fluorinations.

In some particular embodiments the present invention may be employed in producing a chemical reaction between at least one monohydroxyaromatic compound and at least one aldehyde or ketone to produce a bisphenol. Suitable monohydroxyaromatic compounds include, but are not limited to, substituted and unsubstituted monocyclic, monohydroxyaromatic compounds and substituted and unsubstituted polycyclic, monohydroxyaromatic compounds, illustrative examples of which include substituted and unsubstituted phenols and naphthols. Substituents, when present, include, but are not limited to, one or more of alkyl, alkenyl, alkoxy, cyano, or halogen substituents and mixtures thereof, such as $C_1$–$C_{30}$ straight-chain, branched, or cyclo-alkyl, methyl, ethyl, propyl, isopropyl, n-butyl, isobutyl, tertiary butyl, allyl, chloro, bromo, and fluoro. In some particular embodiments monohydroxyaromatic compounds include at least one of phenol, methylphenol, chlorophenol, bromophenol, dimethylphenol, dichlorophenol, or dibromophenol.

Suitable aldehydes include, but are not limited to, aryl aldehydes and alkyl aldehydes comprising 1–30 carbon atoms. In a particular embodiment suitable aldehydes include alkyl aldehydes with alkyl groups comprising 1–30 carbon atoms. Alkyl groups may be straight-chain, branched, or cyclic. Illustrative examples of aldehydes include, but are not limited to, acetaldehyde, benzaldehyde, butyraldehyde, hexanal, methylhexanal, heptaldehyde, heptenal, octyl aldehyde, nonyl aldehyde, decyl aldehyde, dodecyl aldehyde, tridecanal, and valeraldehyde. Suitable ketones include, but are not limited to, arylalkyl ketones, and symmetrical and unsymmetrical dialkyl ketones. Alkyl groups and arylalkyl groups comprise 1–30 carbon atoms. In unsymmetrical dialkyl ketones each alkyl group independently comprises 1–30 carbon atoms. Alkyl groups may be straight-chain, branched, or cyclic. Alkyl groups and aryl groups may be substituted or unsubstituted. In some embodiments the alkyl groups of the dialkyl ketone may be connected to form a cyclic ketone. Illustrative examples of ketones include, but are not limited to, acetone, butanone, methylbutanone, heptanone, methylheptanone, hexanone, methylhexanone, pentanone, methylpentanone, octanone, nonanone, decanone, undecanone, ethyl vinyl ketone, adamantanone, decalone, cyclohexanone, cyclodecanone, cyclododecanone, and acetophenone.

Bisphenols produced by reaction of at least one monohydroxyaromatic compound and at least one aldehyde or ketone include, but are not limited to, those with the structure of formula (I):

(I)

wherein $A^1$ represents an aromatic group such as phenylene, naphthylene, and the like. E may be an alkylene or alkylidene group such as methylene, ethylene, ethylidene, propylene, propylidene, isopropylidene, butylene, butylidene, isobutylidene, amylene, amylidene, isoamylidene, and the like. In addition, E may be a cycloaliphatic group e.g., cyclopentylidene, cyclohexylidene, 3,3,5-trimethylcyclohexylidene methylcyclohexylidene, 2-[2.2.1]-bicycloheptylidene, neopentylidene, cyclopentadecylidene, cyclododecylidene, adamantylidene, and the like. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR wherein R is an alkyl group; it being only necessary that $Y^1$ be inert to and unaffected by the reactants and reaction conditions used to prepare the bisphenol. The letter "m" represents any integer from and including zero through the number of positions on $A^1$ available for substitution; and "p" represents an integer from and including zero through the number of positions on E available for substitution.

In bisphenols of formula (I) above, when more than one Y substituent is present, they may be the same or different. The same holds true for the $R^1$ substituent. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments both $A^1$ radicals are unsubstituted phenylene radicals; and E is an alkylidene group such as isopropylidene. In some particular embodiments both A¹ radicals are p-phenylene, although both may be o- or m-phenylene or one o- or m-phenylene and the other p-phenylene.

In some embodiments bisphenols are of the formula (II):

(II)

where independently each R is as defined hereinbefore, and independently $R_g$ and $R_h$ are hydrogen or a $C_{1-30}$ monovalent hydrocarbon group. In some embodiments $R_g$ and $R_h$ may be joined to form at least one ring.

Some illustrative, non-limiting examples of bisphenols of formula (I) include 4,4'-(3,3,5-trimethyl-cyclohexylidene)-diphenol; 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isoprophylphenyl)propane; 2,2-bis(4-hydroxy-3,5-dimethylphenyl)propane; (3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,2-bis(4-hydroxyphenyl)butane; 2,2-bis-(4-hydroxyphenyl)-2-methylbutane; 1,1-bis-(4-hydroxyphenyl)cyclohexane; 2-(3-methyl-4-hydroxyphenyl-2-(4-hydroxyphenyl)propane; 2-(3,5-dimethyl-4-hydroxyphenyl)-2-(4-hydroxyphenyl)-propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis(3,5-dimethylphenyl-4-hydroxyphenyl)-2-methyl-butane; 3,3-bis-(3,5-dimethylphenyl-4-hydroxyphenyl)pentane; 1,1-bis-(3,5-dimethylphenyl-4-hydroxyphenyl)cyclopentane; and 1,1-bis-(3,5-dimethylphenyl-4-hydroxyphenyl)cyclohexane.

EXAMPLE

The following prophetic example utilizes a mathematical reaction kinetic model to compare incremental flow reactor behavior with continuous stirred tank reactor behavior. The example is included to provide additional guidance to those skilled in the art in practicing the claimed invention and is merely representative of the teaching of the present application. Accordingly, this example is not intended to limit the invention in any manner.

The dihydric phenol 2,2-bis(p-hydroxyphenyl) propane (commonly referred to as "bisphenol-A", "BPA" or "pp-BPA") is commercially prepared by condensing 2 moles of phenol with a mole of acetone in the presence of an acid catalyst. The phenol is typically provided in molar excess of the stoichiometric requirement. Optional reaction promoters, such as free mercaptans, can be added to aid the reaction. Common acid catalysts for the production of BPA include acidic ion exchange resins, such as sulfonic acid substituted polystyrene and the like. Current industry research efforts are focused on improving the effectiveness of these ion exchange catalysts and identifying additional promoters.

Figure 2:
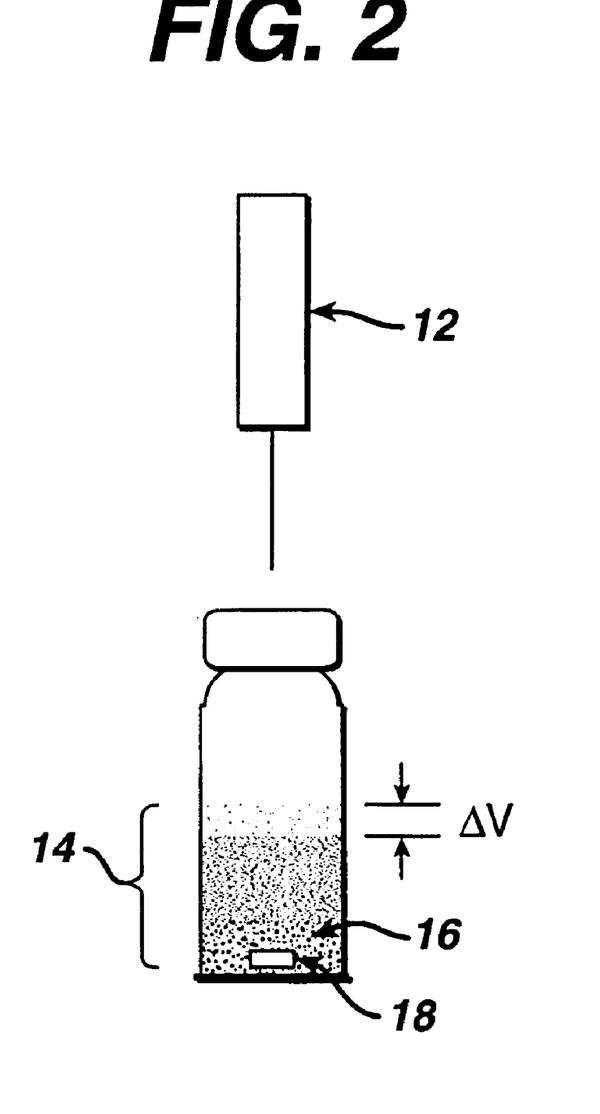
FIG. 2 is a schematic view of a device capable of performing an aspect of an embodiment of the present invention.

In this context, assume that the ion exchange resin-catalyzed formation of BPA from phenol and acetone is conducted in continuous-flow reactors at a space velocity of 2.33 g liquid feed/g resin/hr. For a small vial containing 150 mg resin and 1000 μL liquid volume, the corresponding liquid flow rate for a true continuous flow reactor would be 338 μL/hr (assuming a liquid feed specific gravity of 1.018 g/mL). To mimic continuous flow in the small vial example using the incremental flow method, the following sequence would be followed:

With reference to FIG. 2, each vial or reaction well is loaded with the appropriate mixture of phenol:acetone feed 12. The feed can contain optional promoter(s) and catalyst(s). Each vial is provided with resin beads 16 and an optional stir bar 18. It will often be beneficial to allow the initial feed to sit for an extended period in contact with the resin to allow the resin to swell.

The reaction is allowed to proceed in batch mode for one time interval, Δt. Near the end of this time interval, a probe (not shown) withdraws one liquid volume increment, ΔV, of reaction mixture 14 from the vial (reactor effluent). The withdrawn volume increment is replaced with an equal volume increment, ΔV, of fresh feed 12. Cycle time, Δt, is defined as the time period between s additions. The incremental withdrawal and addition of reactants is continued until the reaction reaches a substantially steady state, and screening data are collected.

The values of the time intervals and volume increments (Δt and ΔV) can be selected to obtain a desired space velocity. The relationship between the time intervals and volume increments is as follows:

$$\Delta t = \frac{\rho \cdot \Delta V \cdot 60}{SV \cdot R}$$

wherein Δt = time interval [min];
ΔV = volume increment;
ρ = density of liquid feed;
SV = space velocity [g liquid feed/g resin/hr]; and
R = amount of resin.

Figure 3:
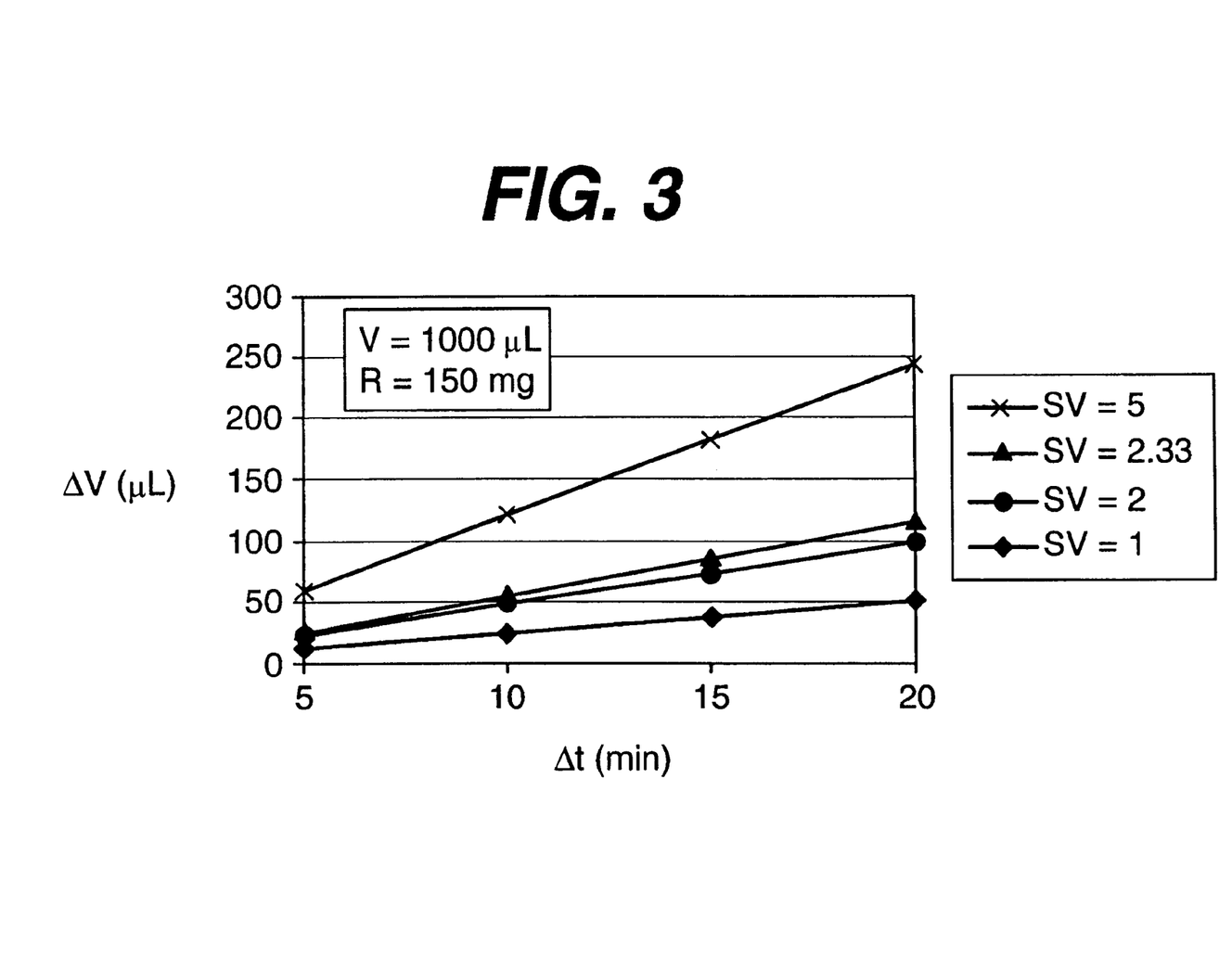
FIG. 3 is a graphical representation of the relationship among various reaction conditions.

The relationship between Δt and ΔV is plotted in FIG. 3 for the present example ($V_{tot}$=1000 μL; resin amount=150 mg/L; space velocity=2.33 g liquid flow/g resin/hr), along with results for a range of other space velocities.

Figure 4A:
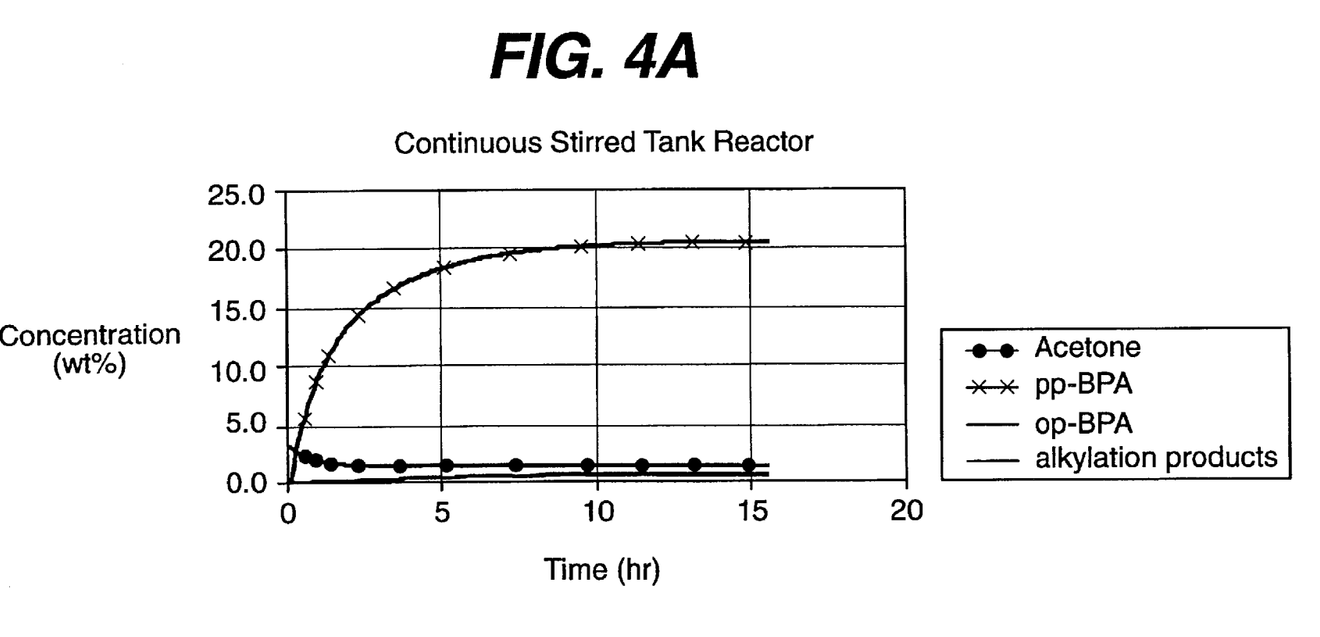
FIG. 4 is a graphical representation of a reaction kinetics model comparing a continuous stirred tank reactor with an incremental flow reactor.
Figure 4B:
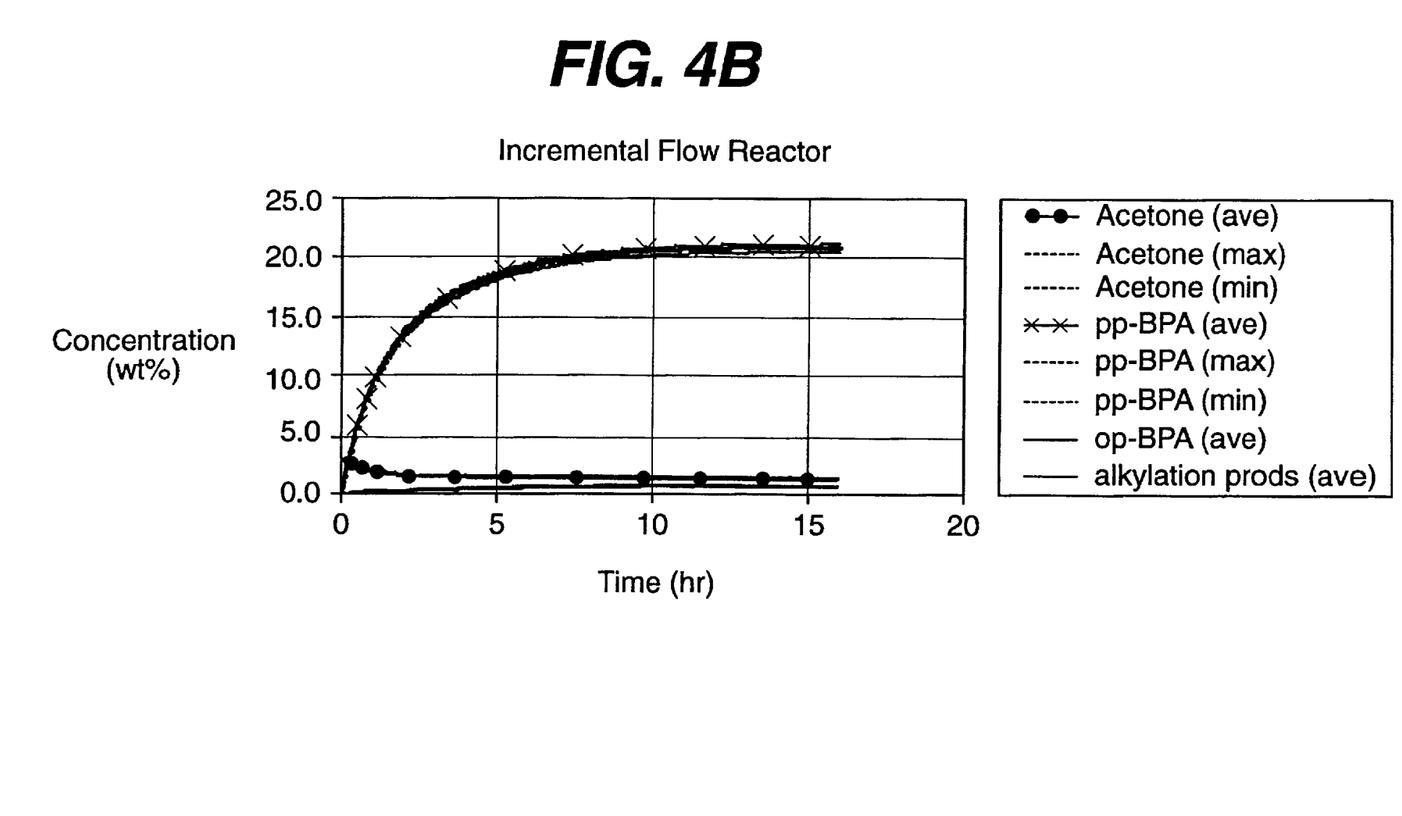

FIG. 4 shows a comparison between the incremental flow method and a traditional continuous stirred tank reactor (CSTR). These plots were generated using mathematical reaction kinetics models with the following parameters:

| | |
|---|---|
| Δt = 5.7 minutes | $k_{pp}$ = 1 hr⁻¹ |
| ΔV = 30 μL | $k_{op}$ = 0.005 hr⁻¹ |
| Space velocity = 2.33 g liquid feed/g resin/hr | $k_{isofwd}$ = 0.01 hr⁻¹ |
| Resin amount = 150 mg | $k_{isorev}$ = 0.01 hr⁻¹ |
| Liquid volume in reactor = 1000 μL | $k_{alk}$ = 0.01 hr⁻¹ |

The hypothetical model reactions are shown below:

It is clear that the incremental flow method closely emulates the CSTR under these conditions.

It will be understood that each of the elements described above, or two or more together, may also find utility in applications differing from the types described herein. While the invention has been illustrated and described as embodied in a method for high throughput chemical screening, it is not intended to be limited to the details shown, since various modifications and substitutions can be made without departing in any way from the spirit of the present invention. For example, various detection techniques may be incorporated into the method to provide data at accelerated rates. As such, further modifications and equivalents of the embodiments herein disclosed may occur to persons skilled in the art using no more than routine experimentation, and all such modifications and equivalents are believed to be within the spirit and scope of the invention as defined by the following claims.

What is claimed is:

1. A method of producing a chemical reaction between a monohydroxyaromatic compound and an aldehyde or ketone to produce a bisphenol in a batch reactor emulating the conditions of a continuous flow reactor by incremental flow, the method comprising the steps of:
   a) providing a reaction vessel and reactants;
   b) placing reactants in the reaction vessel;
   c) allowing the reaction to proceed for a time interval;
   d) withdrawing a volume increment of the reaction mixture comprising at least one of the reactants from the reaction vessel;
   e) adding a volume increment of at least one of the reactants to the reaction vessel; and
   f) repeating steps c), d), and e) until the reaction reaches a substantially steady state, as shown by analysis.

2. The method of claim 1, wherein the reactants include a substituted or unsubstituted monocyclic, monohydroxyaromatic compound, or a substituted or unsubstituted polycyclic, monohydroxyaromatic compound.

3. The method of claim 2, wherein the reactants include phenol.

4. The method of claim 2, wherein the reactants include at least one aryl aldehyde comprising 1–30 carbon atoms or at least one alkyl aldehyde comprising 1–30 carbon atoms, or at least one ketone selected from the group consisting of arylalkyl ketones, symmetrical dialkyl ketones, and unsymmetrical dialkyl ketones, wherein aryl and alkyl groups each independently comprise 1–30 carbon atoms.

5. The method of claim 4, wherein the reactants include acetone.

6. The method of claim 4, wherein the reaction comprises formation of at least one bisphenol of formula (I):

wherein $A^1$ represents an aromatic group; E represents an alkylene group, an alkylidene group, or a cycloaliphatic group; $R^1$ represents hydrogen or a monovalent hydrocarbon group; $Y^1$ represents an inorganic atom, a halogen atom, an inorganic group, nitro, an organic group, alkenyl, allyl, or hydrogen or a monovalent hydrocarbon group, or an oxy group OR wherein R is an alkyl group; the letter "m" represents any integer from and including zero through the number of positions on $A^1$ available for substitution; and "p" represents an integer from and including zero through the number of positions on E available for substitution.

7. The method of claim 6, wherein the reaction comprises formation of bisphenol A.

8. The method of claim 1, wherein the added volume increment comprises phenol.

9. The method of claim 1, wherein the added volume increment comprises acetone.

10. The method of claim 1, wherein the reaction vessel further contains an ion exchange resin.

11. The method of claim 1, wherein the added volume increment further comprises a reaction promoter.

12. The method of claim 1, further comprising the step of selecting the reactor residence time of at least one of the reactants by controlling the time interval between additions.

13. The method of claim 1, further comprising the step of selecting the reactor residence time of at least one of the reactants by controlling the size of the volume increments added and withdrawn from the reactor.

14. The method of claim 10, wherein the time intervals and the volume increments are selected to obtain a desired space velocity according to the following relationship:

$$\Delta t = \frac{\rho \cdot \Delta V \cdot 60}{SV \cdot R}$$

wherein $\Delta t$ is the time interval (minutes), $\Delta V$ is the volume increment, $\rho$ is density of the volume increment added, $SV$ is the space velocity (grams liquid feed/grams resin/hour), and $R$ is the quantity of ion exchange resin.

15. The method of claim 1, further comprising the steps of:
   adding a sample volume increment, the volume increment being larger than the volume increment added in step d);
   withdrawing volume sub-increments of the reaction mixture at appropriate subintervals within the time interval, such that the sum of the volume sub-increments is equivalent to the sample volume increment; and
   analyzing the volume sub-increments to provide data regarding the concentration gradient during a time interval.

16. The method of claim 1, wherein the size of the volume increments are chosen to minimize concentration gradients between time intervals.

17. The method of claim 1, wherein the volume increments withdrawn from the reaction vessel are analyzed for concentration of reactants and product.

18. The method of claim 1, wherein the volume increments withdrawn from the reaction vessel are pooled and subsequently analyzed to provide cumulative data.

19. The method of claim 1, wherein the volume increments are withdrawn from the reaction vessel by positioning a probe at a predetermined level within the reaction vessel and withdrawing reactor fluid until no further fluid can be withdrawn by the probe at the predetermined level.

20. The method of claim 1, wherein after the reaction is allowed to proceed for a time interval the volume increments are withdrawn and added simultaneously.

21. The method of claim 1, wherein after the reaction is allowed to proceed for a time interval volume increments are added before being withdrawn.

22. A method of producing a chemical reaction between phenol and acetone to produce bisphenol A in a batch reactor emulating the conditions of a continuous flow reactor by incremental flow, the method comprising the steps of:

a) providing a reaction vessel and reactants;

b) placing at least one of the reactants in the reaction vessel;

c) allowing the reaction to proceed for a time interval;

d) withdrawing a volume increment of the reaction mixture comprising at least one of the reactants from the reaction vessel;

e) adding a volume increment of at least one of the reactants to the reaction vessel; and f) selecting the time intervals and the volume increments to obtain a desired space velocity.

23. The method of claim 22, wherein the added volume increment comprises phenol.

24. The method of claim 22, wherein the added volume increment comprises acetone.

25. The method of claim 22, wherein the reaction vessel further contains an ion exchange resin.

26. The method of claim 22, wherein the added volume increment further comprises a reaction promoter.

27. The method of claim 22, further comprising the step of selecting the reactor residence time of at least one of the reactants by controlling the time interval between additions.

28. The method of claim 22, further comprising the step of selecting the reactor residence time of at least one of the reactants by controlling the size of the volume increments added and withdrawn from the reactor.

29. The method of claim 22, wherein the desired space velocity is obtained by selecting the time intervals and the volume increments in accordance with the following relationship:

$$\Delta t = \frac{\rho \cdot \Delta V \cdot 60}{SV \cdot R}$$

wherein $\Delta t$ is the time interval (minutes), $\Delta V$ is the volume increment, $\rho$ is density of the volume increment added, $SV$ is the space velocity (grams liquid feed/grams resin/hour), and $R$ is the quantity of ion exchange resin.

30. The method of claim 22, further comprising the steps of:

adding a sample volume increment, the volume increment being larger than the volume increment added in step d);

withdrawing volume sub-increments from the reaction mixture at appropriate subintervals within the time interval, such that the sum of the volume sub-increments is equivalent to the sample volume increment; and analyzing the volume sub-increments to provide data regarding the concentration gradient during a time interval.

31. The method of claim 22, wherein the size of the volume increments are chosen to minimize concentration gradients between time intervals.

32. The method of claim 22, wherein the volume increments withdrawn from the reaction vessel are analyzed for concentration of reactants and product.

33. The method of claim 22, wherein the volume increments withdrawn from the reaction vessel are pooled and subsequently analyzed to provide cumulative data.

34. The method of claim 22, wherein the volume increments are withdrawn from the reaction vessel by positioning a probe at a predetermined level within the reaction vessel and withdrawing reactor fluid until no further fluid can be withdrawn by the probe at the predetermined level.

35. The method of claim 22, wherein after the reaction is allowed to proceed for a time interval the volume increments are withdrawn and added simultaneously.

36. The method of claim 22, wherein after the reaction is allowed to proceed for a time interval volume increments are added before being withdrawn.

* * * * *